Nov. 26, 1957   B. PHILLIPS ET AL   2,814,641
PROCESS FOR PRODUCING PERACIDS FROM
ALIPHATIC CARBOXYLIC ACIDS
Filed July 31, 1956
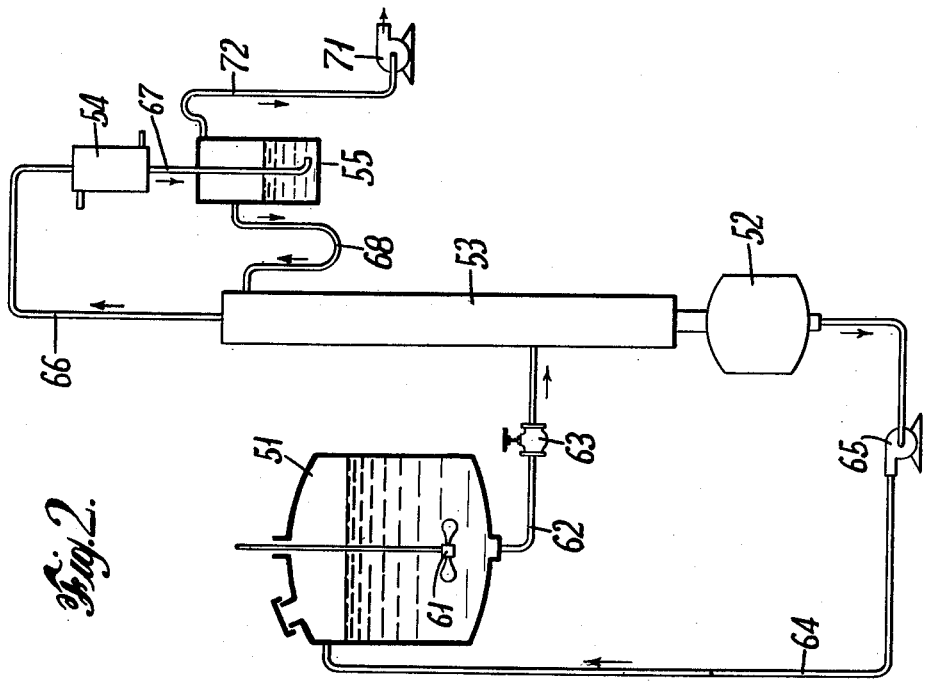
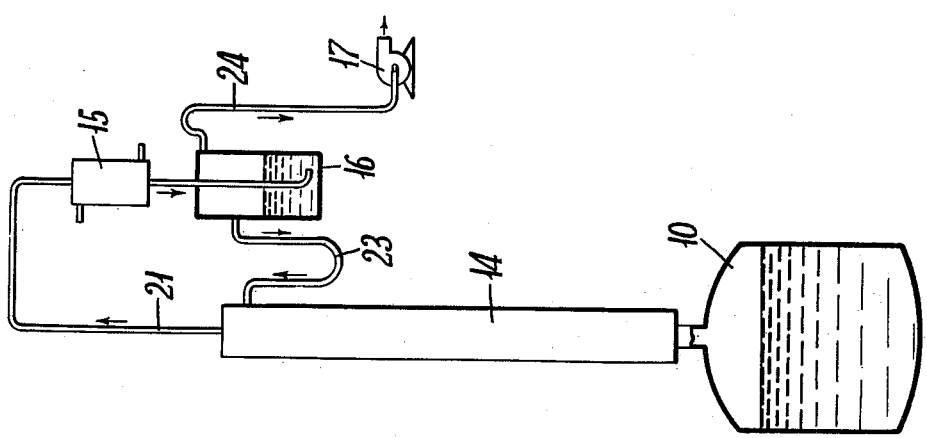
INVENTORS
BENJAMIN PHILLIPS
PAUL S. STARCHER
BERTRAND D. ASH
BY *Rudolph S. Nelson*
ATTORNEY

2,814,641

PROCESS FOR PRODUCING PERACIDS FROM ALIPHATIC CARBOXYLIC ACIDS

Benjamin Phillips and Paul S. Starcher, Charleston, and Bertrand D. Ash, St. Albans, W. Va., assignors to Union Carbide Corporation, a corporation of New York Application July 31, 1956, Serial No. 601,138

15 Claims. (Cl. 260—502)

Our invention relates to process for the production of peracids from carboxylic acids and hydrogen peroxide. More particularly it is directed to an improvement in processes for the production of peracetic acid and perpropionic acid whereby the peracid can be obtained in solution free of hydrogen peroxide and other contaminants. Furthermore the solution of peracid can be obtained substantially free of water or, for that matter, less water than is usually present in peracid solutions hitherto commercially available.

The reaction of hydrogen peroxide with a carboxylic acid to form the peracid has long been known. The reaction which is reversible, can be illustrated by the following equation, with specific reference to peracetic acid as a matter of convenience.

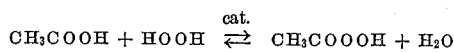

$$CH_3COOH + HOOH \underset{}{\overset{cat.}{\rightleftarrows}} CH_3COOOH + H_2O$$

The reaction can be carried out by heating a mixture of the acetic acid with hydrogen peroxide in the presence of a strong mineral acid as catalyst. The point of equilibrium can be shifted to the right by using in the reaction mixture a large amount of acetic acid, much more than is required to react with all the hydrogen peroxide. Because of the instability of the peracetic acid, difficulties are encountered in effecting a separation between it and the water, hydrogen peroxide, and acetic acid present in the reaction mixture. All of these impurities can open the epoxide rings which are formed upon oxidizing ethylenic groups with the peracetic acid, and the sulfuric acid or other catalyst present serves to catalyze the ring opening. While it is true that the sulfuric acid can be neutralized with some benefit, it is also true that the resulting salt is also a catalyst for epoxide destruction.

A number of expedients have been suggested with the aim of overcoming these difficulties. Thus, it has been attempted to isolate pure peracetic acid by crystallization, but the procedure is too hazardous for commercial operations. Crystalline peracetic acid is more explosive than a solution of the peracid not only because of the higher concentration of the crystal form but also because of the likelihood of an explosion being initiated by mechanical or thermal shock.

Another proposed expedient is to substitute acetic anhydride for part or all of the acetic acid in making the peracetic acid. Although this permits of the preparation of anhydrous solutions of peracetic acid by removal of any water by reaction with the anhydride, and even though the solution can be made so as to be free of unreacted hydrogen peroxide, the possibility exists of the anhydride reacting with peracetic acid to give diacetyl peroxide. Diacetyl peroxide is not only highly explosive but it interferes with the use of the peracetic acid for epoxidation. For instance, diacetyl peroxide catalyzes polymerizations.

Still another proposed expedient is to concentrate the peracetic acid solution by a step of fractional distillation with a resultant increase in the peracid content to a value which can be as high as 60 to 75 percent by weight. Aside from the explosion hazards attending the distillation operation is the additional disadvantage of a substantial loss of peracid in the aqueous forefraction unless considerable precautions are taken to avoid it.

The same or similar situations are encountered with perpropionic acid.

The present improvement is based on our discovery that it is possible to produce an aliphatic peracid in solution substantially if not entirely free of water and hydrogen peroxide by carrying out the reaction between the carboxylic acid and hydrogen peroxide in the presence of an organic liquid which, at the temperature and pressure employed for the reaction, forms with the water present a heterogeneous, minimum-boiling azeotrope; and simultaneously vaporizing from the reaction mixture a heterogeneous azeotrope of water with the organic liquid. It is an essential feature of the present improvement that the organic liquid to be employed is a solvent for the peracid; that it is non-reactive with the other constituents of the reaction mixture; that, at the temperature and pressure of the reaction, it forms a heterogeneous, minimum-boiling azeotrope with water preferentially, such that the aqueous layer of the collected distilled azeotrope does not contain more than 0.5 mole of the peracid, if any, per mole of water in the distillate; that its boiling point is not higher than 130° C. and that the vapor pressure of the heterogeneous azeotrope at the temperature employed in the reaction is higher than the vapor pressure of the peracid at the same temperature, thus to enable the heterogeneous azeotrope to be distilled off from the reaction mixture as the reaction proceeds.

In carrying out our process the azeotrope-forming liquid should have a normal boiling point of at least 50° C. With azeotrope-forming solvents whose normal boiling point is below 50° C., the water content of the azeotrope is so low that very little water is removed on distillation of the azeotrope. The slow removal of water, in turn, tends unduly to prolong the stripping of the water from the reaction mixture with consequent lengthening of the reaction period or lessened yields or both.

In order to enable the stripping of the water from the reaction mixture, it is essential in accordance with our process that the boiling point of the azeotrope should be below that of the peracid being produced at the particular operating temperature employed. According to our experience liquids whose normal boiling points are above 130° C. do not satisfy this requirement. Preferably, the boiling point of the azeotrope should be at least 10° C. below the boiling point of the peracid at the operating temperature, and to this end azeotrope-forming solvents whose normal boiling points are in the range from about 70° C. to 110° C. are preferred.

According to our studies organic liquids of the following kinds or classes are suitable for use as a solvent-azeotrope former in accordance with our discovery.

*Saturated lower aliphatic carboxylic esters*

Representative of the carboxylic esters are those methyl, ethyl, propyl, isopropyl, normal butyl, isobutyl, secondary butyl and isoamyl esters of formic, acetic, propionic, normal butyric and isobutyric acids which have a normal boiling point within the range of about 50° C. to 130° C. Esters normally boiling from about 70° C. to 110° C. are preferred. Preferred also are the esters having at least two carbons each to the alkyl and acyl groups thereof, especially ethyl acetate, propyl acetate, isopropyl acetate and ethyl isobutyrate as being the more resistant to hydrolysis than the methyl esters and the formates.

Saturated lower aliphatic ethers

Representative of the aliphatic ethers are those ethers, simple or symmetrical or mixed, in which the alkyl and cycloalkyl groups attached to the ether oxygen atom are methyl, ethyl, propyl, isopropyl, normal butyl, isobutyl, secondary butyl, tertiary butyl, cyclopentyl, neopentyl, tertiary amyl, isoamyl, primary isoamyl, 3-pentyl, and normal amyl which have a normal boiling point within the range of about 50° C. to 130° C. Ethers normally boiling from about 70° C. to 110° C. are preferred. Ethers additionally containing chlorine or fluorine boiling within this range and stable under the conditions of the reaction (as for instance those in which the carbon atom to which the halogen is attached is not directly adjacent the ether-oxygen atom) are not excluded.

Halocarbons

Representative of this class or group is chloroform.

Aromatic hydrocarbons

Of the aromatic hydrocarbons, benzene normally boiling at about 80° C. and toluene normally boiling at about 110° C. are satisfactory. For the production of perpropionic acid these two aromatic hydrocarbons are especially suitable and are preferred.

In employing these azeotrope-formers according to our improvement, the water removal operation can be carried out at pressures ranging from as low as 6 millimeters of mercury absolute with one of the higher boiling of the organic liquids, butyl acetate for instance, up to a pressure of about 4 atmospheres with one of the lower boiling of the organic liquids. Preferably, however, the water removal step is conducted at subatmospheric pressures.

Preferably, in carrying out our process, the carboxylic acid and the hydrogen peroxide are employed in equivalent amounts, stoichiometrically. By the use of equivalent amounts, which is preferred, the absence of either unreacted hydrogen peroxide or unreacted carboxylic acid in any substantial amount in the final product can be accomplished at least in theory by carrying the reaction to completion. For some applications of the peracid, however, the use of precisely equivalent amounts in its production is not essential, as for instance in the bleaching of textiles, or in the oxidation of sulfides to sulfones and the like, where the presence of an appreciable amount of the carboxylic acid can be tolerated. As far as is known, no particular advantage is to be gained by the presence of hydrogen peroxide along with the peracid. The reaction of the carboxylic acid and hydrogen peroxide being reversible, not only the removal of water, one of the reaction products, but also the presence in the reaction mixture of the carboxylic acid in an amount larger than would be required for reaction with all of the hydrogen peroxide, favors a faster rate of reaction or a more complete utilization of the hydrogen peroxide or both in accordance with well established principles governing equilibrium in the case of reversible reactions as here. Instead of distilling off all of the water, to drive the reaction to completion, it is possible also to stop the reaction at a desired point in the conversion by limiting the amount of water removed. By way of illustration the process can be stopped at a point where the solution of the peracetic or perpropionic acid in the organic liquid contains as much as 20 percent or as little as 3 percent, or the water removal can be continued until the reaction has proceeded to completion and the peracid solution substantially free of water.

By way of further illustration, conversions as high as 90 percent approximately, of the hydrogen peroxide are readily obtainable by our process using the starting materials in substantially molar equivalent amounts or with the acid slightly in preponderance. In contrast thereto, in operations not employing our improvement, a ratio of approximately 10 moles of acetic acid per mole of hydrogen peroxide (aqueous, 50 percent $H_2O_2$) and approximately 4.7 moles of acetic acid per mole of hydrogen peroxide (aqueous, 90 percent $H_2O_2$) would be required to attain the same or similar conversion.

The concentration of the hydrogen peroxide starting material that can be used in our process is not narrowly critical. We can employ with good results the aqueous solutions of hydrogen peroxide that are available commercially. The preferred concentration is dictated to some extent by economical factors. As to this aspect we prefer to use a solution having a hydrogen peroxide content of about 25 to 95 percent by weight. The higher the concentration of the solution the less the amount of water to be removed during the course of the reaction, with consequent advantages in the reduction of the time and heating requirements of the process. Also with concentrations of 25 percent or higher of hydrogen peroxide, the tendency for peracid to distill over as constituent of the azeotrope is minimized.

As catalyst in our process we can use those materials which are acidic esterification catalysts, as that term is commonly used and understood in the art. The following acids are representative: sulfuric acid, the alkyl sulfonic acids, the aryl sulfonic acids, phosphoric acid and the alkyl hydrogen phosphates, trifluoroacetic acid, acetylsulfoacetic acid. In addition a number of ion exchange resins have been found to give satisfactory results. Preferred catalysts are sulfuric acid and the alkyl sulfonic and aryl sulfonic acids. The following are representative of the sulfonic acids:

Ethanesulfonic acid
Butanesulfonic acid
Hexanesulfonic acid
Decanesulfonic acid
Benzenesulfonic acid
Toluenesulfonic acid
Xylenesulfonic acid
Naphthalenesulfonic acid
Sulfonated polystyrene
Sulfonated styrene-divinylbenzene copolymers such as the commercially available cationic exchange resins, i. e., "Dowex 50" and "Amberlite IR-120"

The catalyst should be employed in an amount effective to provide at least a moderately rapid rate of reaction. To this end it is desirable to use at least 0.2 part of catalyst per 100 parts of the carboxylic acid by weight. In the absence of catalyst, the reaction proceeds but slowly and is of lesser commercial value. If desired, an amount of catalyst as high as 5 parts per 100 parts of carboxylic acid can be employed, and the use of more than 5 parts is without commensurate advantage in our experience, especially in those instances where neutralization of the catalyst prior to use of the peracid is indicated. An amount which is about 1 to 2 parts of catalyst per 100 parts by weight of carboxylic acid is preferred.

The process can be carried out either batchwise or continuously as may be desired. It can be carried out quite readily by heating a solution of the hydrogen peroxide and the carboxylic acid, either acetic acid or propionic acid as the case may be, in the presence of the catalyst, and concurrently removing the water from the reaction mixture. The reaction can be carried out at a temperature from 20° C. to 90° C. but a temperature within the range of 30° C. to 65° C. is preferred. Below 30° C. the reaction proceeds slowly. Temperatures above 65° C., on the other hand, favors loss of active oxygen to molecular oxygen by decomposition of the hydrogen peroxide, or of the peracid or both. Preferably also, the stripping of the water is carried out at a reduced pressure, i. e. at a pressure somewhat below atmospheric pressure. The carrying out of the stripping at a reduced pressure is advantageous also in maintaining a lower temperature to minimize decomposition of the peracid product, The accompanying drawing illustrates diagrammatically some forms of apparatus suitable for the process of the present invention:

Figure 1 being a diagrammatic representation of one form of apparatus for carrying out the process either batchwise or continuously and at a pressure below atmospheric if desired, and Figure 2 being a diagrammatic representation of another form of apparatus for carrying out the process in which the reaction mixture is cycled between the reaction vessel and a still column.

Referring to Figure 1, the apparatus comprises a reaction vessel 10, a fractionating column or rectifier 14 mounted thereon, a condenser 15, a decanter 16 and a vacuum pump 17. Acetic acid, aqueous hydrogen peroxide, the organic liquid solvent and the acidic esterification catalyst are supplied to the reaction vessel by connections not shown to form a reaction mixture which is heated by any suitable heating means not shown. The broken horizontal line in vessel 10, is a diagrammatic representation of a liquid level but otherwise is without significance. Vapors rising from the reaction mixture pass into the rectifier 14 connected to the reaction vessel near the top. In the rectifier 14, vapors of the peracid are liquefied and returned to the reaction vessel along with any other material that may be condensed. Vapors not condensed in the rectifier are led from the rectifier near the top through pipe 21 to the condenser 15 cooled by a suitable expedient not shown. The liquid condensate formed in condenser 15 flows through pipe into decanter 16 at a place near the bottom thereof, and below the surface of the liquid body maintained in the decanter. In the decanter the condensate separates into an aqueous layer and an organic layer. The upper or organic layer is returned to the rectifier through conduit 23, while the lower or aqueous layer is withdrawn from the decanter from time to time by an outlet pipe near the bottom not shown. For operations at a pressure below atmospheric pressure, the pressure in the apparatus is reduced by vacuum pump 17 operating to withdraw gases or vapors from the decanter at a place near the top through tube 24.

Referring to Figure 2, the apparatus diagrammatically represented therein comprises a reaction vessel 51, a still kettle 52, surmounted by a fractionating column or rectifier 53, a condenser 54, and a decanter 55. Similar to the operation in Figure 1, acetic acid, aqueous hydrogen peroxide, organic liquid solvent and the acidic esterification catalyst are supplied to the reaction vessel 51, which in this case is shown provided with a stirrer or agitator 61. The contents of the reaction vessel may be maintained under atmospheric pressure, or at a higher or lower pressure as may be desired. The peracid-containing reaction mixture flows through line 62 provided with a flow control valve 63 into the fractionating column 53, at a place near the middle thereof where it flows downwardly over plates or similar devices not shown, contained in the column. As the reaction mixture flows downwardly it is brought into intimate contact with heated vapors comprising the azeotroping agent and is stripped of its water content. The stripped liquid passes from the bottom of the column into the still kettle where it is heated by heating means not shown to produce heated vapors which pass upwardly into the rectifier while the heated, stripped liquid is cycled back to the reaction vessel 51 through conduit 64, which is provided with a liquid circulating pump 65.

The water stripped from the reaction mixture rises in vapor form upwardly through the rectifier in admixture with the azeotroping liquid and exits near the top of the rectifier through line 66 and flows to the condenser 54 where the water and azeotroping liquid are condensed. The condensate is introduced into decanter 55 by a line 67 at a place below the level of liquid maintained in the decanter wherein the condensate separates into an organic liquid layer. The upper or organic layer is returned to the rectifier through a line 68 while the lower or aqueous layer is withdrawn from the decanter from time to time through an outlet pipe not shown. For operations at a pressure below atmospheric pressure, a vacuum pump 71 is provided. As shown the suction opening of the vacuum pump is connected to the decanter at a place near the top thereof by line 72.

The following examples are illustrative:

*Example 1.*—Hydrogen peroxide (1.48 moles) in the form of 144 grams of an aqueous solution (35 percent $H_2O_2$); 88 grams of acetic acid (1.48 moles) and 2.4 grams of concentrated sulfuric acid, all in 1200 grams of chloroform was charged to a still kettle provided with a fractionating column and a decanting head so constructed as to permit removal of water without the need of breaking the vacuum. The reaction mixture was heated at a kettle temperature of 40° C. and the pressure in the apparatus reduced to a point where distillation took place at that kettle temperature. The distillate separated into two layers, the top layer being the aqueous layer, which was withdrawn from the decanting head during the distillation. At the end of eleven hours, 126 grams of aqueous layer containing a small amount of hydrogen peroxide had been removed. The total amount of water to have been removed, by theory, was calculated to be 121 grams.

There was obtained as a residue product in the still kettle 1211 grams of a chloroform solution of peracetic acid. The peracetic acid content was found by analysis to be 6.7 percent of 72 percent of theory. The amount of unreacted hydrogen peroxide remaining in the residue product was 1.57 grams.

*Example 2.*—Propionic acid (370 grams; 5 moles), hydrogen peroxide (4 moles) in the form of 426 grams of an aqueous solution, 32 percent $H_2O_2$, and 3.7 grams of concentrated sulfuric acid, all in 1193 grams (800 milliliters) of chloroform was charged to a still kettle equipped with a fractionating column, and a decanting head so constructed as to permit removal of water without the need of breaking the vacuum. The reaction mixture which contained in addition 0.5 gram of a polyphosphate sequestering agent commercially available under the trade name "Victawet 35B" (Victor Chemical Works) was heated at a kettle temperature of 40° C. and the pressure reduced to about 250 millimeters of mercury absolute. At this temperature and pressure, a water-chloroform azeotrope distilled and was collected in the decanting head where it separated into two layers. The aqueous or upper layer was removed during the distillation, and amounted to 365 grams over a period of twenty hours. According to theory, the removable water was 362 grams.

Upon completion of the reaction, some of the chloroform was stripped from the kettle contents at a temperature of 33° C. and an absolute pressure of 110 millimeters of mercury. Perpropionic acid amounting to 240 grams (calculated) was obtained as a residue product in the form of 449 grams of a chloroform solution having a perpropionic acid content of 53.4 percent, by analysis. This corresponds to an efficiency of 67 percent, based on the hydrogen peroxide. A small amount of perpropionic acid (11 grams; 0.12 mole) was removed from the kettle contents with the chloroform.

*Example 3.*—Hydrogen peroxide (2 moles) in the form of 194 grams of an aqueous solution (35 percent $H_2O_2$); 120 grams (2 moles) of acetic acid; and 3.1 grams of concentrated sulfuric acid, all in 688 grams of isopropyl acetate was charge to a still kettle provided with a fractionating column and decanting head. The kettle contents were heated at a temperature of 40° C. under conditions carefully controlled as not to exceed that temperature. The heating was also carried out under a pressure sufficiently below atmospheric as to result in the distillation of a water-isopropyl acetate azeotrope during the heating. The condensate separated into two layers in the decanting head, which was so constructed and arranged as to permit the removal of water without the need of breaking the vacuum, and the lower or aqueous layer was continuously removed. After a period of 7.5 hours, the distillate was free of water, except possibly a trace.

The material remaining in the kettle, totalling 709 grams, was found upon analysis, to contain 123 grams or 17.3 percent by weight of peracetic acid, corresponding to a yield of 80 percent of theory. Unreacted hydrogen peroxide in the residue product was 3.5 grams or about 0.5 percent by weight, thus indicating that the reaction had been carried practically to completion.

*Example 4.*—Acetic acid (234 grams; 3.9 mole); hydrogen peroxide (103 grams; 3.02 moles) in the form of 114 grams of an aqueous solution (90 percent $H_2O_2$) and 10 grams of concentrated sulfuric acid; all in 660 grams of ethyl acetate was charged to a still kettle provided with a fractionating column and a decanting head. The reaction mixture contained in addition 1.5 milliliters of a 30 percent solution in acetic acid of a polyphosphate sequestering agent commercially available under the trade name "Victawet 35B." The kettle contents were heated at a temperature maintained at 50° C. and a distillation carried out at a reduced pressure of 180 millimeters of mercury absolute. At this temperature and pressure a good rate of distillation resulted. The water that distilled over layered out in the decanter which was so constructed and arranged to permit removal of the water continuously during the distillation without the need of breaking the vacuum. The distillation of the water was complete, or nearly so, at the end of 7.75 hours.

Peracetic acid amounting to 200 grams (calculated) was obtained as a residue product in the form of 853 grams of an ethyl acetate solution having a peracetic acid content of 23.4 percent by weight by analysis, corresponding to a yield of 87 percent of theory. Only a small amount of unreacted hydrogen peroxide (0.44 percent $H_2O_2$ by weight; 3.8 grams) remained in the ethyl acetate solution, thus indicating that the reaction had gone to completion.

*Example 5.*—Acetic acid (117 grams; 1.95 moles) and hydrogen peroxide (51 grams; 1.5 moles) in the form of 56.5 grams of aqueous solution (90 percent $H_2O_2$) all in 310 grams of ethyl acetate was charged to a still kettle equipped as in the preceding examples. No catalyst was present in the reaction mixture. The kettle contents to which had been added 0.7 milliliter of a 30 percent acetic acid solution of a polyphosphate sequestering agent ("Victawet 35B") was heated at a temperature of 50° C. and under a reduced pressure of 130 millimeters of mercury absolute. The rectifying column was maintained at a temperature such that the water distilled from the reaction mixture while the remaining vapor constituents refluxed under the prevailing pressure-temperature relations. The water which layered out in the decanting head was continuously removed, and at the end of 3 hours, 20 milliliters had distilled. Upon raising the kettle temperature to 60° C. with a corresponding adjustment of the pressure, three more milliliters were obtained over an additional period of 4.67 hours. Upon analysis, the kettle material amounting to 375 grams was found to contain 3.8 percent by weight of peractic acid and 11 percent of hydrogen peroxide corresponding to a conversion to peracetic acid of 12.5 percent. The peroxide balance was 95.5%.

The kettle temperature was thereupon raised to 70° C. with a corresponding adjustment in the pressure and the reaction continued for an additional 6.75 hours. Nine milliliters more of water was distilled and obtained for a total of 32 milliliters. The kettle residue, totalling 343 grams, was found upon analysis to contain 20.6 grams or 5.96 percent of peracetic acid corresponding to an overall conversion of 18 percent. The total peroxide recovery was 64 percent.

*Example 6.*—Acetic acid (117 grams; 1.95 moles); hydrogen peroxide (51.3 grams; 1.5 moles) in the form of 96 grams of aqueous solution (53.4 percent $H_2O_2$) and 5 grams of sulfuric acid; all in 300 grams of n-propyl acetate was charged to a still kettle provided with a rectifying column and decanting head as in the preceding examples. To the reaction mixture was also added 0.7 milliliter of a 30 percent acetic acid solution of a polyphosphate sequestering agent ("Victawet 35B"). The reaction mixture was heated to a temperature of 50° C. and the pressure reduced to 85 millimeter of mercury absolute. At the end of two hours and 50 minutes, 82 milliliters of water had distilled and been drawn off. The kettle residue totalling 378 grams was found to contain 25.2 percent of 95.3 grams of peracetic acid, corresponding to a yield of 83.5 percent. An additional 4.8 grams of peracetic acid was found in the propyl acetate distillate layer, thus raising the overall yield 4.2 percent to 87.7 percent. The residue was found also to contain 0.04 percent or 0.15 gram unreacted hydrogen peroxide, and approximately 2.3 percent of the peroxide charged or 2.6 grams was removed as peracetic acid in the aqueous distillate layer.

*Example 7.*—Hydrogen peroxide (51.3 grams; 1.5 moles) in the form of 96 grams of aqueous solution (53.4 percent $H_2O_2$); 117 grams (1.95 moles) of acetic acid; and 15 grams (dry basis) of the acid form of a sulfonic acid type ion-exchange resin ("Amberlite IR-120" brand); all in 300 grams of n-propyl acetate was charged to a still kettle equipped as in the preceding examples. The mixture which also contained 0.7 milliliters of a 30 percent solution of a polyphosphate sequestering agent ("Vitawet 35B" brand) was heated, at a kettle temperature of 50° C. and a reduced pressure of 80 to 100 millimeters of mercury under reflux. At the end of 2.67 hours, 86 milliliters of water had distilled and was removed. The cooled kettle residue containing the peracetic acid was filtered to remove the ion-exchange resin. The filtrate amounting to 344 grams was a clear colorless solution of peracetic acid in propyl acetate. The peracetic acid content was found upon analysis to be 24.7 percent by weight or 86.2 grams, corresponding to a yield based on the hydrogen peroxide of 75.6 percent. An additional 6.9 grams of peracetic acid was present in the upper layer (propyl acetate layer) of the distillate, thus increasing the yield to 81.7 percent of theory. The solution contained no strong acid and 0.09 percent (0.31 gram) of unreacted hydrogen peroxide. Also, of the hydrogen peroxide initially charged, 3.8 percent appeared in the water layer as peracetic acid.

*Example 8.*—Hydrogen peroxide (51.3 grams; 1.5 moles) in the form of 96 grams of an aqueous solution (53.4 percent $H_2O_2$); 117 grams (1.95 moles) of acetic acid; and 5 grams of concentrated sulfuric acid all in 300 grams of isopropyl acetate was charged to a still kettle equipped as in the previous examples. The mixture which contained in addition 0.7 milliliters of a 30 percent solution in acetic acid of a polyphosphate sequestering agent ("Victawet 35B" brand) was heated at a temperature of 50° C. and under a reduced pressure of about 120 to 135 millimeters of mercury absolute. The heating was carried under reflux except as to the water-isopropyl acetate azeotrope which was removed. At the end of 3.5 hours a total of 79 milliliters of water had distilled and was removed. There was obtained as a residue product 374 grams of an isopropyl acetate solution of peracetic acid. The peracetic acid content was found upon analysis to be 26.2 percent by weight or 98 grams. The yield based on the hydrogen peroxide was 86 percent of theory. The product contained practically no unreacted hydrogen peroxide, not more than 0.01 percent by weight.

What is claimed is:

1. In a process for purifying an aliphatic monocarboxylic peracid having from two to three carbon atoms to the molecule produced by the reaction in the liquid phase and in the presence of an esterification catalyst of the corresponding aliphatic monocarboxylic acid and aqueous hydrogen peroxide, the improvement wherein the aliphatic monocarboxylic acid and the hydrogen peroxide are employed for said reaction in substantially equivalent amounts and in admixture in the reaction mixture with a non-reactive organic liquid having a boiling point at atmospheric pressure in the range of from 50° C. to 130° C. and which is a solvent for the peracid and not for water and which forms with water a heterogeneous azeotrope containing not more than 0.5 mole of the peracid per mole of water; and vaporizing water from the solution of peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

2. In a process for purifying an aliphatic monocarboxylic peracid having from two to three carbon atoms to the molecule produced by the reaction in the liquid phase and in the presence of an esterification catalyst of the corresponding aliphatic monocarboxylic acid and aqueous hydrogen peroxide having a hydrogen peroxide content of from 25 to 95 percent by weight the improvement wherein the aliphatic monocarboxylic acid and the aqueous hydrogen peroxide are employed for said reaction in admixture in the reaction mixture with a non-reactive organic liquid which is a solvent for the peracid and not for the water and which forms with water a heterogeneous azeotrope containing not more than 0.5 mole of the peracid per mole of water said organic liquid being selected from the group consisting of chloroform, benzene, toluene and saturated lower aliphatic ethers and lower aliphatic carboxylic esters normally boiling between 50° C. and 130° C., and vaporizing water from the solution of peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

3. In a process for purifying an aliphatic monocarboxylic peracid having from two to three carbon atoms to the molecule produced by the reaction in the liquid phase and in the presence of a catalytic amount of the acid form of an acid-type ion exchange resin of the corresponding aliphatic monocarboxylic acid and aqueous hydrogen peroxide, the improvement wherein the aliphatic monocarboxylic acid and the hydrogen peroxide are employed for said reaction in admixture in the reaction mixture with a non-reactive organic liquid having a boiling point at atmospheric pressure in the range from 50° C. to 130° C. and which is a solvent for the peracid and not for water and which forms with water a heterogeneous azeotrope containing not more than 0.5 mole of the peracid per mole of water; and vaporizing water from the solution of peracid in said organic liquid at a temperature in the range of from 20° C. to 90° C. in the form of said heterogeneous azeotrope until an amount of water corresponding to all of the solvent water of the aqueous hydrogen peroxide and at least part of the water formed in the reaction has been removed from the reaction zone; and filtering the peracid solution to remove the catalyst therefrom.

4. In a process for purifying peracetic acid produced by the reaction of acetic acid and aqueous hydrogen peroxide having a hydrogen peroxide content of from 25 to 95 percent by weight in the liquid phase and in the presence of an esterification catalyst in the reaction mixture, the improvement wherein the acetic acid and the hydrogen peroxide are employed for said process in admixture in the reaction mixture with a non-reactive organic liquid having a boiling point at atmospheric pressure in the range from 50° C. to 130° C. and which is a solvent for the peracid and not for water and which forms with water a heterogeneous azeotrope containing not more than 0.5 mole of the peracid per mole of water; and vaporizing water from the solution of the peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

5. In a process for purifying perpropionic acid produced by the reaction of propionic acid and aqueous hydrogen peroxide having a hydrogen peroxide content of from 25 to 95 percent by weight in the liquid phase and in the presence of an esterification catalyst in the reaction mixture, the improvement wherein the propionic acid and the hydrogen peroxide are employed for said process in admixture in the reaction mixture with a non-reactive organic liquid having a boiling point at atmospheric pressure in the range from 50° C. to 130° C. and which is a solvent for the peracid and not for water and which forms with water a heterogeneous azeotrope containing not more than 0.5 mole of the peracid per mole of water; and vaporizing water from the solution of the peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

6. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of a small amount of an esterification catalyst in the reaction mixture, the improvement wherein the aliphatic monocarboxylic acid and the hydrogen peroxide are employed for said reaction in admixture in the reaction mixture with a non-reactive organic liquid having a boiling point at atmospheric pressure in the range from 50° C. to 130° C. and which is a solvent for the peracid and not for water and which forms with water a heterogeneous azeotrope containing not more than 0.5 mole of the peracid per mole of water; and vaporizing water from the solution of peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

7. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of a small amount of an esterification catalyst in the reaction mixture, the improvement wherein the aliphatic monocarboxylic acid and the hydrogen peroxide are employed for said reaction in admixture in the reaction mixture with chloroform; and vaporizing water from the solution of peracid in said chloroform at a temperature in the range from 20° C. to 90° C. in the form of a heterogeneous azeotrope with the chloroform until an amount of water corresponding to all of the solvent water of the aqueous hydrogen peroxide and at least part of the water formed in the reaction has been removed from the reaction zone.

8. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of a small amount of an esterification catalyst in the reaction mixture, the improvement wherein the aliphatic monocarboxylic acid and the hydrogen peroxide are employed for said reaction in admixture in the reaction mixture with an aromatic hydrocarbon having not more than seven carbon atoms to the molecule; and vaporizing water from the solution of peracid in said aromatic hydrocarbon at a temperature in the range of 20° C. to 90° C. in the form of a heterogeneous azeotrope with said hydrocarbon until an amount of water corresponding to all of the solvent water of the aqueous hydrogen peroxide and at least part of the water formed in the reaction has been removed from the reaction zone.

9. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of an esterification catalyst, the improvement wherein the aliphatic monocarboxylic acid and the hydrogen peroxide are employed for said reaction in admixture in the reaction mixture with a saturated lower aliphatic ether normally boiling between 50° C. and 130° C., said ether being a solvent for the peracid and not for water and forming with water a heterogeneous azeotrope containing not more than 0.5 mole of the peracid per mole of water; and vaporizing water from the solution of peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

10. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of an esterification catalyst, the improvement wherein the aliphatic monocarboxylic acid and the hydrogen peroxide are employed for said reaction in admixture in the reaction mixture with a saturated lower aliphatic carboxylic acid normally boiling between 50° C. and 130° C., said aliphatic carboxylic acid being a solvent for the peracid and not for water and forming with water a heterogeneous azeotrope containing not more than 0.5 mole of the peracid per mole of water; and vaporizing water from the solution of peracid in said organic liquid at a temperature in the range from 20° C. to 90° C. in the form of said heterogeneous azeotrope until an amount of water corresponding to all of the solvent water of the aqueous hydrogen peroxide and at least part of the water formed in the reaction has been removed from the reaction zone.

11. In a process for producing an aliphatic monocarboxylic peracid having from two to three carbon atoms to the molecule by the reaction of the corresponding aliphatic monocarboxylic acid and aqueous hydrogen peroxide having a hydrogen peroxide content of from 25 to 95 percent by weight in the liquid phase and in the presence of an esterification catalyst in the reaction mixture, the improvement wherein the aliphatic carboxylic acid, the aqueous hydrogen peroxide are brought into reactive admixture in a first zone in solution in a non-reactive organic liquid which is a solvent for the peracid and not for water and which is capable of forming with water a heterogeneous azeotrope containing not more than 0.5 mole of the peracid per mole of water, said liquid being selected from the group consisting of chloroform, benzene, toluene and saturated lower aliphatic ethers and saturated lower aliphatic carboxylic esters normally boiling between 50° C. and 130° C., transferring said reaction mixture to a second zone and vaporizing water therefrom in the form of such a heterogeneous azeotrope at a temperature in the range from 20° C. to 90° C., condensing the vapors of said azeotrope and separating the condensate into a water layer and an organic liquid layer; returning organic liquid to the reaction mixture and continuing to vaporize the water therefrom until all of the solvent water of the aqueous hydrogen peroxide and at least part of the water formed in the reaction has been removed from the reaction mixture.

12. In a process for producing peracetic acid by the reaction of acetic acid and aqueous hydrogen peroxide having a hydrogen peroxide content of from 25 to 95 percent by weight in the liquid phase and in the presence of a small amount of an esterification catalyst in the reaction mixture, the improvement wherein the acetic acid and the hydrogen peroxide are employed for said process in admixture in the reaction mixture with chloroform; and vaporizing water from the solution of the peracetic acid in the chloroform at a temperature in the range 25° C. to 60° C. and at a reduced pressure in the form of a water-chloroform azeotrope until an amount of water corresponding to all of the solvent water of the aqueous hydrogen peroxide and substantially of the water formed in the reaction has been removed from the reaction mixture.

13. In a process for producing perpropionic acid by the reaction of propionic acid and aqueous hydrogen peroxide having a hydrogen peroxide content of from 25 to 95 percent by weight in the liquid phase and in the presence of a small amount of an esterification catalyst in the reaction mixture, the improvement wherein the propionic acid and the hydrogen peroxide are employed for said process in admixture in the reaction mixture with chloroform, and vaporizing water from the solution of the perpropionic acid in the chloroform at a temperature in the range 25° C. to 60° C. and at a reduced pressure in the form of a water-chloroform azeotrope until an amount of water corresponding to all of the solvent water of the aqueous hydrogen peroxide and substantially all of the water formed in the reaction has been removed from the reaction mixture.

14. In a process for producing peracetic acid by the reaction of acetic acid and aqueous hydrogen peroxide having a hydrogen peroxide content of from 25 to 95 percent by weight in the liquid phase and in the presence of a small amount of an esterification catalyst in the reaction mixture, the improvement wherein the acetic acid and the hydrogen peroxide are employed for said process in admixture in the reaction mixture with a propyl acetate; and vaporizing water from the solution of the peracetic acid in the propyl acetate at a temperature in the range 25° C. to 60° C. and at a reduced pressure in the form of a water-propyl acetate azeotrope until an amount of water corresponding to all of the solvent water of the aqueous hydrogen peroxide and substantially all of the water formed in the reaction has been removed from the reaction mixture.

15. In a process for producing peracetic acid by the reaction of acetic acid and aqueous hydrogen peroxide having a hydrogen peroxide content of from 25 to 95 percent by weight in the liquid phase and in the presence of a small amount of an esterification catalyst in the reaction mixture, the improvement wherein the acetic acid and the hydrogen peroxide are employed for said process in admixture in the reaction mixture with ethyl acetate, and vaporizing water from the solution of the peracetic acid in the ethyl acetate at a temperature in the range 25° C. to 60° C. and at a reduced pressure in the form of a water-ethyl acetate azeotrope until an amount of water corresponding to all of the solvent water of the aqueous hydrogen peroxide and substantially all of the water formed in the reaction has been removed from the reaction mixture.

References Cited in the file of this patent

UNITED STATES PATENTS 2,028,800    Othmer _____ Jan. 28, 1936

OTHER REFERENCES

Swern: Chem. Reviews, 45:5 (1949), 68 pages.
Rohm and Haas Co. Amberlite Ion Exchange, page 10, Sept. 1953 (14 pp.).